United States Patent [19]

Henricksen et al.

[11] Patent Number: 4,813,582
[45] Date of Patent: Mar. 21, 1989

[54] VEHICULAR MOUNTED FOOD RECEPTACLE

[75] Inventors: Douglas A. Henricksen, Boca Raton; Joseph R. Clemente, Plantation Acres; Thomas P. Miller, Sunrise, all of Fla.

[73] Assignee: QIC Plastics, Inc., Boca Raton, Fla.

[21] Appl. No.: 70,354

[22] Filed: Jul. 7, 1987

[51] Int. Cl.$^4$ .............................................. B65D 1/24
[52] U.S. Cl. ........................... 224/42.43; 224/42.40 R
[58] Field of Search .......... 224/42.43, 42.44, 42.45 R, 224/42.46 R; 312/286

[56] References Cited

U.S. PATENT DOCUMENTS

| 251,229 | 3/1879 | Wooters | D7/70 |
|---|---|---|---|
| 1,899,480 | 10/1932 | Ravlin | 108/46 |
| 2,189,607 | 9/1937 | Krischke | 108/46 |
| 2,584,646 | 2/1952 | Wagstaff | 224/42.43 |
| 2,770,411 | 12/1952 | MacKay | 229/52 B |
| 3,052,506 | 8/1961 | Thomas | 108/46 |
| 3,229,946 | 2/1963 | MacKay | 248/311.2 |
| 4,002,385 | 1/1977 | Hone | 312/286 |
| 4,146,159 | 3/1979 | Hemmen | 224/275 |
| 4,512,503 | 4/1985 | Gioso | 224/275 |
| 4,620,488 | 11/1986 | Formo | 108/46 |
| 4,776,623 | 10/1988 | Manning | 294/143 |

Primary Examiner—Renee S. Luebke
Attorney, Agent, or Firm—Martin John McKinley

[57] ABSTRACT

A food receptacle attaches to either a left or right-hand door of an automobile and provides the occupants with convenient storage for food and change. A reversible drawer slides between two rails suspended below the body of the receptacle with the front of the drawer facing in either direction. To prevent the drawer from being pulled out of the rails, a projection is positioned to one side of the drawer and contacts one of two diametrically opposed protuberances on the receptacle body. When the drawer is reversed, the drawer projection contacts the other protuberance. A coin holder is attached to the front of the drawer and includes an aperture to receive coins. Any coins placed in the holder are trapped therein when the holder is positioned under the receptacle body. These coins will strike a projection on the body to prevent the drawer from being pushed out of the rails. Snap-off tabs are attached to the bottom of the receptacle and rest against the automobile door. Leveling of the receptacle is accomplished by snapping-off selected tabs, or sections of tabs. A flexible strap has an "L" shaped bracket at one end that can be inserted into the window pocket of an automobile door. The strap has two rows of slots. Hooks, attached to the receptacle, are inserted into selected slots.

7 Claims, 3 Drawing Sheets

VEHICULAR MOUNTED FOOD RECEPTACLE

BACKGROUND OF THE INVENTION

This invention relates to the field of vehicular mounted receptacles and trays, and more particularly to such devices that are removably attachable to a door or window of an automobile.

Drivers and passengers frequently consume food and beverages while riding in automobiles. Although vehicular mounted food receptacles and trays have been known in the art for some time, it is rare for an automobile to include such a convenience. These receptacles and trays typically mount to the window or window "pocket" (the recess in an automobile door that contains a roll-up window and associated mechanism) of an automobile door. These devices are usually expensive to manufacture and typically include relatively complex mechanisms for mounting and leveling. Furthermore, these receptacles and trays are usually prohibitively large to remain attached to the automobile door when not in use.

SUMMARY of the INVENTION

Briefly, the invention is a food receptacle that includes a means for containing food and a means for attaching the food receptacle to the door of an automobile. A reversible drawer has a first projection asymmetrically positioned to one side of the drawer. Means for slidably attaching the drawer to the food containing means is provided. Connected to opposite sides of the food containing means are second and third projections. To prevent the drawer from being pulled out of its attaching means, the second projection contacts the first projection when the drawer is installed in a first direction. When the drawer is installed in the opposite direction, the third projection contacts the first projection to prevent the drawer from being pulled out of its attaching means.

In another embodiment, the invention includes a coin holder that traps coins and prevents the drawer from being pushed out of the food receptacle.

In another embodiment, the invention includes a leveling tab that has first and second sections separated by a detent. The first section is attached to the food containing means. The second section can be snapped-off at the detent. When the food receptacle is attached to the automobile door, the tab is positioned between the door and the food containing means. When the second section of the tab has been snapped-off, the first section contacts the door. If the second section has not been snapped-off, then it contacts the door. Thus, the tab provides a means to level the food receptacle.

In another embodiment, the invention includes a plurality of leveling tabs that are attached to the food containing means. Each of these tabs has a unique length and each includes a detent adjacent the food containing means. Each tab can be selectively snapped-off at its detent. When the food receptacle is attached to the automobile door, the longest tab (the longest tab remaining after longer ones have been snapped-off) contacts the door. Thus, the tabs provide a means to level the food receptacle.

In still another embodiment, the food receptacle attacking means includes a flexible strap, and a means for attaching the strap to the door of an automobile. The strap has a plurality of slots, each spaced a unique distance from the strap attaching means. A hook means is attached to the food containing means. The hook means connects the food containing means to the flexible strap by engaging the hook means in one of the slots in the strap.

DESCRIPTION OF THE PREFERRED EMBODIMENT

Figure 1:
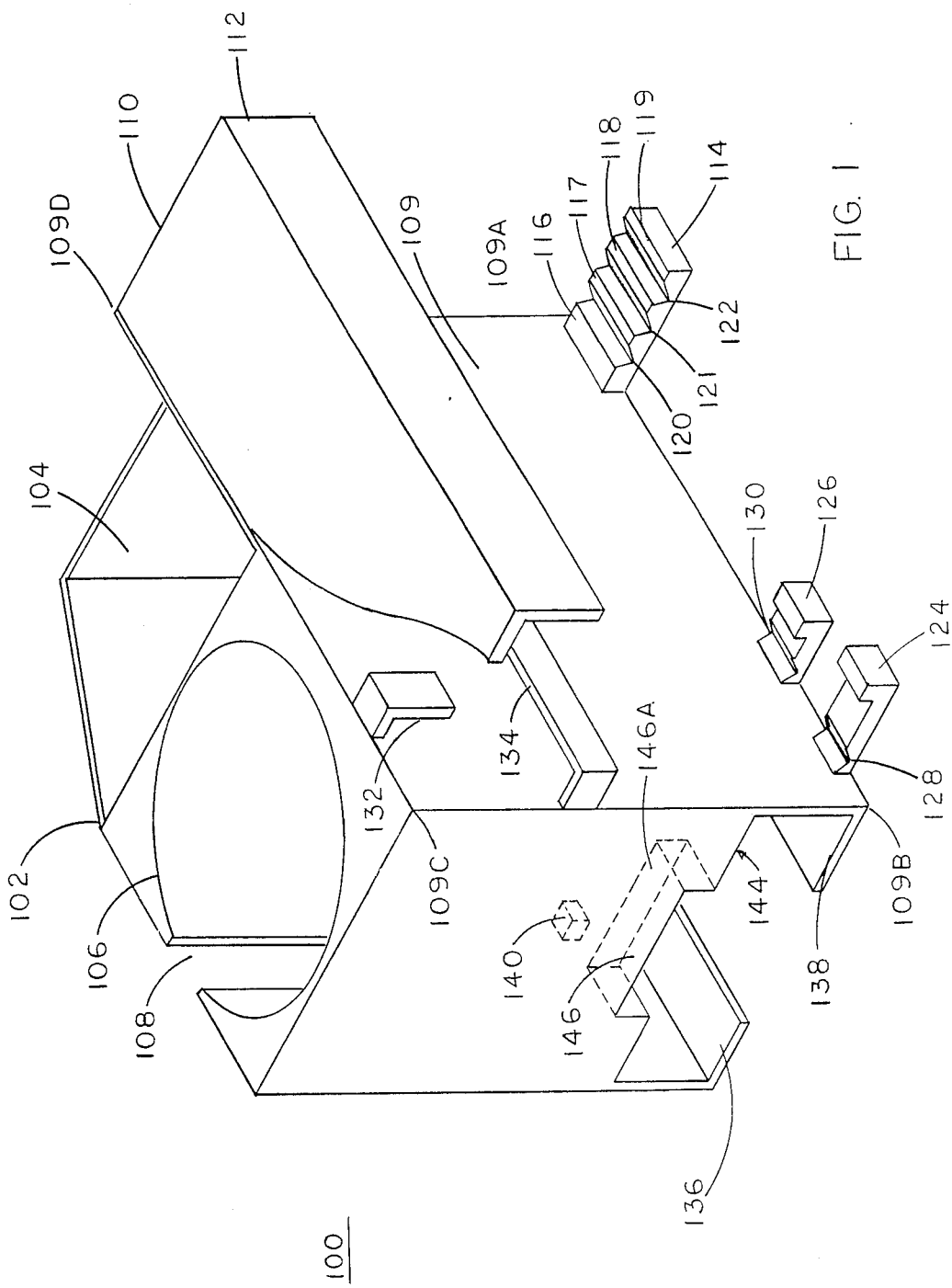
FIG. 1 is a perspective view of the vehicular mounted food receptacle of the present invention.

In FIG. 1, at least three alternate embodiments of the invention are illustrated. When referring to this figure, it should be remembered that not all elements illustrated in the figure coexist in any one embodiment. Referring to this figure, a vehicular mounted food receptacle 100 has a food containing means 102 that includes a substantially parallelepiped shaped open top container 104 and a cup holder 106. Cup holder 106 includes a slot 108 suitable for accepting the handle of a drinking cup. Although the preferred embodiment of food containing means 102 includes open top container 104 and cup holder 106, other configurations are also possible; for example, the food containing means could be configured as a simple tray. Food containing means 102 preferably has a substantially rectangular side 109 that includes four corners 109A-D. When food receptacle 100 is mounted to the door of an automobile, side 109 normally faces the door.

In one embodiment of the invention, an "L" shaped bracket 110 is attached to the top of food containing means 102 at side 109. Food receptacle 100 attaches to the door of an automobile by inserting the vertical section 112 of bracket 110 into the window pocket of the automobile door. Thus, bracket 110 provides a means for attaching food receptacle 100 to the door of an automobile.

A leveling tab 114 is attached to the bottom of food containing means 102 near corner 109A, and includes a plurality of sections 116-119 that are separated by detents 120-122. Detents 120-122 are designed such that the adjacent section 116, 117, 118 or 119 can be easily snapped-off, thereby shortening the overall length of tab 114. Although only one leveling tab 114 is illustrated in FIG. 1, a second, substantially identical tab is preferably attached near corner 109B. If only one tab 114 is included, however, it should be centered between corners 109A and B, and preferably be wider than the one illustrated in the figure. Tabs 124 and 126, hook 132 and guide 134 are not included in this embodiment.

When food receptacle 100 is attached to the door of an automobile, tab 114 rests against the inside of the door. To level food receptacle 100, sections of the tab (and the second substantially identical non-illustrated tab), beginning with section 119, are snapped-off until the receptacle is level.

A second preferred embodiment of the invention also includes bracket 110. In this embodiment, a plurality of tabs, e.g., 124 and 126, each having a unique length, are attached to food containing means 102 in a similar manner as tab 114. Each of the tabs 124 and 126 has a detent 128 and 130 whereat the tab can be snapped-off. Leveling of this embodiment of food receptacle 100 is similar to that of the previously described embodiment, however, rather than snapping-off the outer section of the tab, the longest tab 124 is snapped-off first. If further leveling is required, the shorter tab 126 can also be snapped-off. Although only two such tabs 124 and 126 are illustrated, more (or less) could be used; leveling being accomplished by breaking off the longest tab that's still attached, until a level position is achieved. Although only one set of tabs (124 and 126) is illustrated, a second, substantially identical set is preferably attached to food containing means 102 near corner 109A. Tab 114, hook 132 and guide 134 are not included in this embodiment.

In a third embodiment, bracket 110 is eliminated and in its place, two hooks (only hook 132 is visible in the figure) are attached to the top of food containing means 102, one near each corner 109C and 109D. A "U" shaped guide 134 is attached to surface 109 below the hooks (e.g. 132), thereby forming a guide slot between surface 109 and guide 134.

Figure 2:
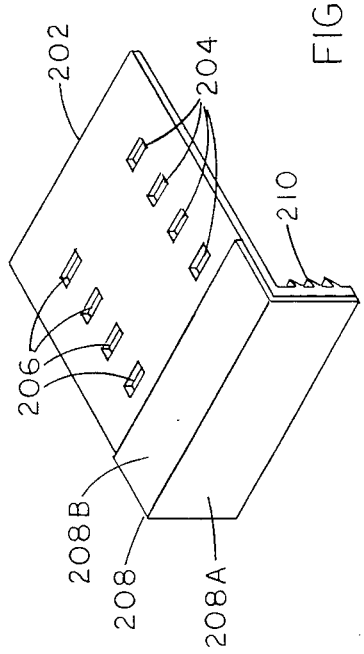
FIG. 2 is a perspective view of the flexible strap.

Referring to FIG. 2, a flexible strap 202 includes two rows of slots 204 and 206. Strap 202 is attached to a rigid or semi-rigid "L" shaped bracket 208 that includes two substantially perpendicular sections 208A and B. Strap 202 is preferably attached to the inside surface of bracket 208 (for example, by adhesive bonding) and that portion of strap 202 that overlies section 208A includes an irregular surface 210. Irregular surface 210 is preferably "sawtooth" shaped with each one of the "teeth" extending the full width of bracket 208. Irregular surface 210 can be conveniently molded into the surface of strap 202. In each row 206, the slots are positioned a unique distance from bracket 208.

To attach the third embodiment of the food receptacle to the door of an automobile, section 208A of bracket 208 is first inserted into the window pocket of the automobile door. The sawteeth on irregular surface 210 increase the insertion resistance of bracket section 208A, making it more difficult to be removed from the window pocket. At this point, bracket section 208B is substantially horizontal, and flexible strap 202 hangs down and conforms to the inside surface of the door. Next, the food containing means 102 is attached to strap 202 by inserting the hooks (e.g., 132) into a selected pair of the strap slots, one from each row 204 and 206. If food containing means 102 does not hang substantially flush with the inside of the door, the hooks (e.g., 132) can be repositioned into a different pair of strap slots. To accommodate the wide variation among commercially available motor vehicles in the distance between the window pocket and the inside of the door, strap 202 should be approximately 6 inches long. Any excess strap material that extends below the hooks (e.g., 132) can be conveniently tucked in the guide slot between "U" shaped bracket 134 and food containing means 102. Although two hooks and two rows of slots are preferred, this embodiment could also be construed with one hook centered between corners 109C and D, and one row of strap slots. Thus, the flexible strap and hooks also provide a means for attaching the food receptacle to the door of an automobile.

Figure 4:
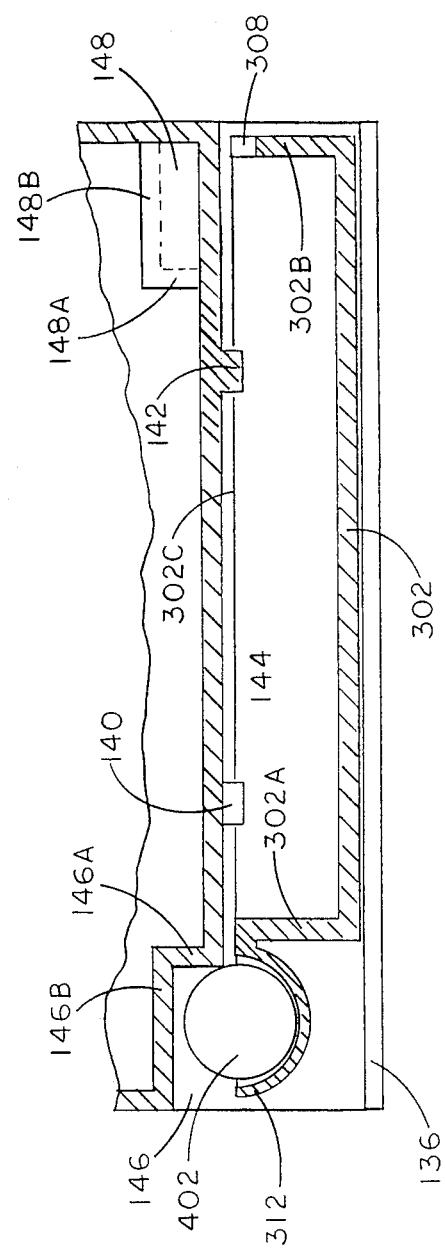
FIG. 4 is a cross-sectional view of the drawer installed between the rails at the bottom of the food receptacle, as seen along line 4—4 of FIG. 3.

Returning to FIG. 1, two rails 136 and 138, open at both ends, are suspended below the body of food containing means 102 and form a pocket into which a drawer can be inserted from either direction. Two protuberances 140 and 142 (protuberance 142 is illustrated in FIG. 4 only) are attached to the upper wall 144 of the drawer pocket (the lower surface of the body of the food containing means) and are positioned diametrically, i.e., diagonally, opposite each other and spaced equal distances from the center line of the drawer pocket. Two recesses 146 and 148 (recess 148 is visible in FIG. 4 only) are formed above the drawer pocket at opposite ends of the food containing means. Recesses 146 and 148 each have a back wall, 146A and 148A respectively.

Figure 3:
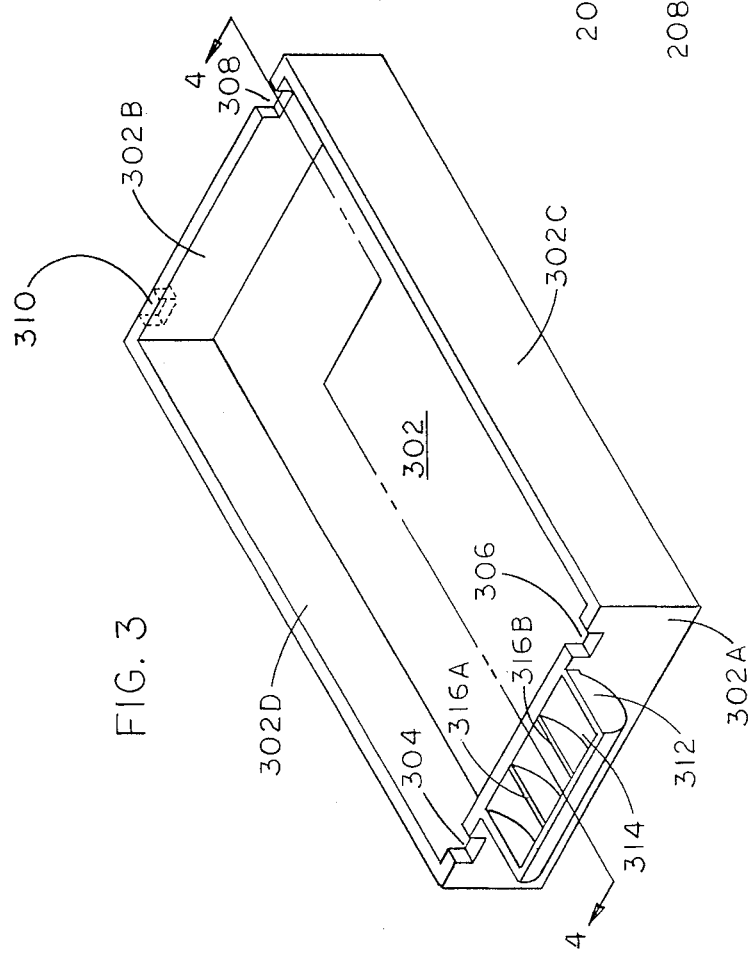
FIG. 3 is a perspective view of the drawer.

Referring to FIG. 3, a drawer 302 has front and back walls 302A and B respectively, and side walls 302C and D. Two notches 304 and 306 are formed at opposite sides of front wall 302A, and one notch 308 is formed towards one side of back wall 302B. Notches 304, 306 and 308 are each spaced the same distance from the center line of the drawer as protuberances 140 and 142 are spaced from the center line of the drawer pocket. Note that there is no notch at location 310. As will be explained in greater detail below, the portion of back wall 302B at location 310 functions as a "projection" that contacts protuberances 140 and 142 to prevent the drawer from being pulled out of its pocket.

A coin holder 312 is attached to front wall 302A and includes a substantially semi-cylindrical aperture 314 for receiving coins in an upright position. Two dividers 316A and B form three separate "chambers", and the diameter of aperture 314 in each chamber can be varied to accommodate different sizes of coins; for example, nickels, dimes and quarters.

FIG. 4 is a cross-sectional view of food receptacle 100 showing drawer 302 installed, in a first direction, between rails 136 and 138. Referring to this figure, drawer 302 is first installed in the drawer pocket by sliding it, coin holder end first, between rails 136 and 138. Drawer 302 is reversible, and the direction of installation illustrated in FIG. 4 (with coin holder 312 positioned towards recess 146) will be referred to as the first direction. As the drawer is being installed in the first direction, protuberance 142 slides through notch 306, and thereby presents no impediment to the installation of the drawer. If the drawer is installed in the opposite direction, protuberance 140 slides through notch 306.

In the normal operation of a drawer, the user typically grasps the front of the drawer, here the coin holder, and pushes or pulls the drawer to open or close it. To describe the operation of the reversible drawer, the terms "push" and "pull" will be used in their normal sense, with the term "push" indicating movement in the direction from front 302A to back 302B, and the term "pull" indicating movement in the direction from back 302B to front 302A.

Drawer 302 and food receptacle 102 include means for preventing the drawer from being pulled out of the drawer pocket, regardless of the direction of installation. When drawer 302 is installed in the first direction, rear wall 302B strikes protuberance 140 at location 310 to prevent the drawer from being completely pulled out of the drawer pocket. It should be noted that when drawer 302 is installed in the first direction, the other protuberance 142 slides through notch 308 and does not interfere with the normal operation of the drawer. When drawer 302 is installed in the opposite direction, rear wall 302B contacts protuberance 142 at location 310, also preventing the drawer from being pulled completely out of the drawer pocket. Similarly, protuberance 140 does not interfere with the normal operation of drawer 302 because it slides through notch 308.

In operation, that portion of rear wall 302B at location 310 functions as a "projection" that contacts one of the protuberances 140 or 142, depending on the direction of installation of the drawer, to prevent the unintentional removal of the drawer from its pocket. Other embodiments of the invention could be envisioned that function in a similar manner, but don't utilize notches 304, 306 and 308. For example, drawer 302 could include a tab or "projection" that would be attached to rear wall 302B immediately above location 310. Walls 302A-D would be shorter in this embodiment, so that they would clear protuberances 140 and 142 on the upper surface 144 of the drawer pocket. When attempting to pull the drawer out of the pocket, the projection would contact one of the protuberances 140 or 142, just as the "projection" at location 310 of back wall 302B does.

Drawer 302 and food containing means also include means to prevent the drawer from being pushed out of the drawer pocket. Referring to FIG. 4, a coin 402 is shown positioned in the aperture of coin holder 312. Coin 402 contacts the rear wall 146A of recess 146 to prevent the drawer from being pushed out of the drawer pocket. Also, when drawer 302 is pushed into the drawer pocket far enough so that coin holder 312 is under recess 146, the upper wall 146B of the recess traps coin 402 in the recess and prevents the coin from being jarred from the coin holder. In addition, some security is provided for coins that are placed in coin holder 312 because they are hidden from view by recess 146. When drawer 302 is installed in the opposite direction, walls 148A and B of recess 148 provide similar benefits.

One advantage of the previously described food receptacle is that it can be easily and inexpensively manufactured in plastic by injection molding. In the embodiments of the invention that utilize bracket 110, only two parts are necessary: the food receptacle which includes integrally molded leveling tabs and attaching bracket, and the drawer. Another advantage of the invention is that the food receptacle is compact when not in use, but expandable by extending the drawer. Thus the drawer becomes a convenient storage surface for a sandwich or the like. The food receptacle can also be mounted on either left or right hand doors of an automobile because the expandable element, i.e. the drawer, is reversible and can always be positioned towards the occupant. If this feature were not provided, the occupant would inconveniently have to reach over food containing means 102 to get to the drawer if the food receptacle were mounted on the "wrong" door of the automobile.

We claim as our invention:

1. A food receptacle, comprising in combination:
   means for containing food;
   receptacle attaching means, connected to said food containing means, for attaching said food receptacle to the door of an automobile;
   a reversible drawer having a first projection asymmetrically positioned towards one side of said drawer;
   means for slidably attaching said drawer to said food containing means; and
   second and third projections connected to opposite sides of said food containing means, said second projection contacting said first projection to prevent said drawer from being pulled out of said drawer attaching means when said drawer is installed in said drawer attaching means in a first direction, and said third projection contacting said first projection to prevent said drawer from being pulled out of said drawer attaching means when said drawer is installed in said drawer attaching means in a second direction.

2. The food receptacle of claim 1, further comprising:
   a coin holder connected to said drawer and having an aperture for receiving coins, wherein coins placed in said aperture are trapped between said coin holder and said food containing means when said drawer is pushed into said drawer attaching means a predetermined distance.

3. The food receptacle of claim 2, further comprising:
   a fourth projection connected to said food containing means, wherein said fourth projection contacts coins placed in said aperture of said coin holder to prevent said drawer from being pushed out of said drawer attaching means.

4. The food receptacle of claim 1, further comprising:
   a leveling tab having first and second sections separated by a detent whereat said second section can be snapped-off, said first section being connected to said food containing means, said tab being positioned between said door and said food containing means when said food receptacle is attached to said door, said second section contacting said door when said second section is attached to said tab and said first section contacting said door when said second section has been snapped-off, said tab thereby providing a means to level said food receptacle.

5. The food receptacle of claim 1, comprising:
   a plurality of leveling tabs attached to said food containing means, each of said tabs having a unique length and each including a detent adjacent said food containing means whereat said tabs can be selectively snapped-off, said tabs being positioned between said door and said food containing means when said food receptacle is attached to said door, the longest of said tabs still attached to said food containing means contacting said door, said tabs thereby providing a means to level said food receptacle.

6. The food receptacle of claim 1, wherein said attaching means includes:
   strap attaching means for attaching a strap to the door of an automobile;
   a flexible strap attached to said strap attaching means, said strap including a plurality of slots, each of said slots being spaced a unique distance from said strap attaching means;
   hook means, attached to said food containing means, for connecting said food containing means to said flexible strap by engaging said hook means in a selected one of said slots of said strap.

7. The food receptacle of claim 6, wherein:
   said strap attaching means includes an "L" shaped bracket including first and second substantially perpendicular sections, said first section including an irregular surface, said first section for insertion into the window pocket of said automobile door.

* * * * *